June 9, 1959 P. I. GRIMSHAW 2,889,950
BOAT LOADING AND CARRYING DEVICE FOR ATTACHMENT TO AUTOMOBILES
Filed Oct. 15, 1957 2 Sheets-Sheet 1
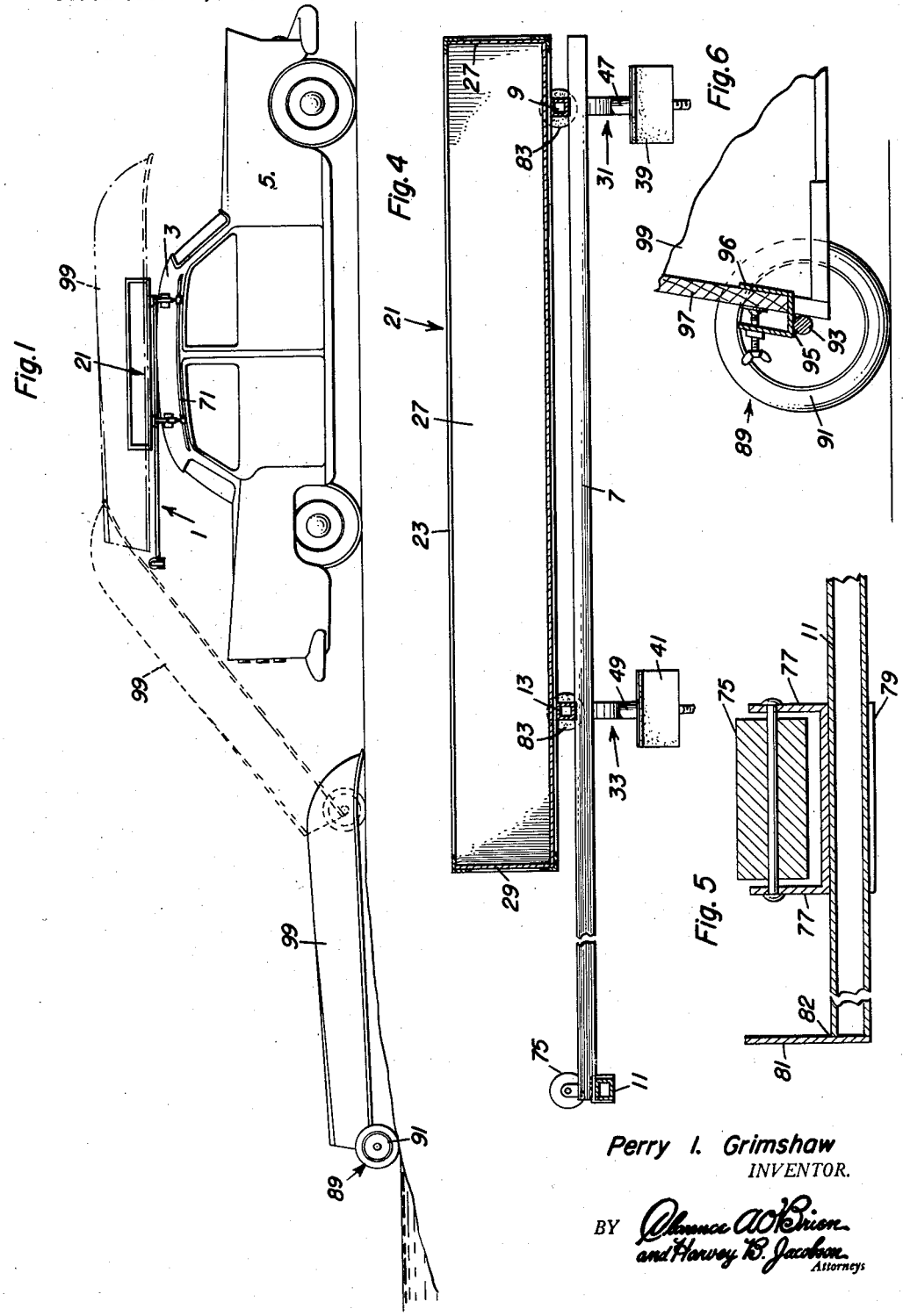
Perry I. Grimshaw
INVENTOR.

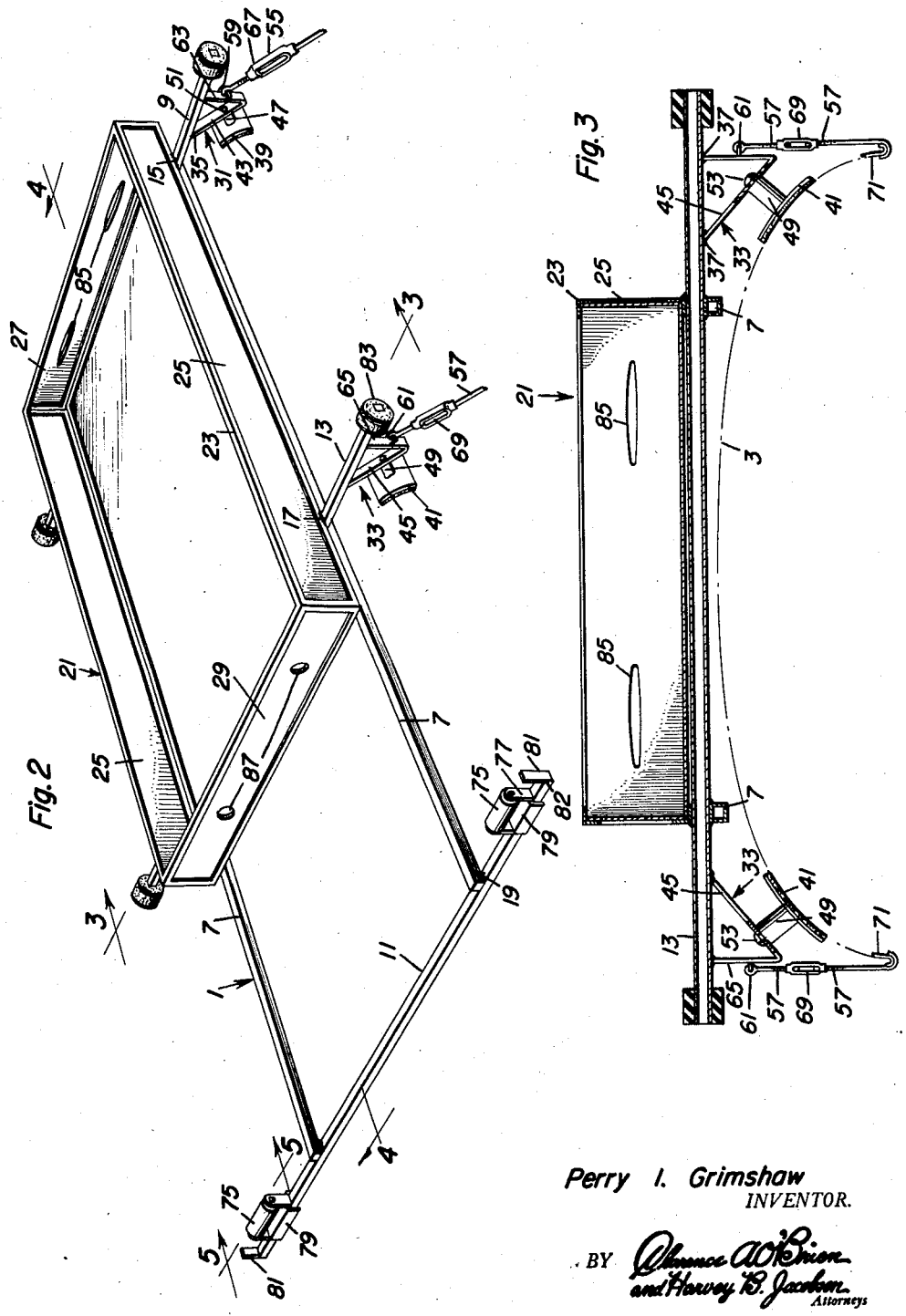

United States Patent Office 2,889,950
Patented June 9, 1959

2,889,950

BOAT LOADING AND CARRYING DEVICE FOR ATTACHMENT TO AUTOMOBILES

Perry I. Grimshaw, Mayville, Mich., assignor to Mayville Boat Carrier, Incorporated, Mayville, Mich., a corporation of Michigan Application October 15, 1957, Serial No. 690,317

1 Claim. (Cl. 214—450)

My invention relates to improvements in devices for loading and carrying small boats on automobile tops.

The primary object of my invention is to provide a practical, efficient device for carrying a small boat, such as a rowboat, on an automobile top, which device is easily attached to the gutters of the automobile top, is provided with means whereby one man can quickly load a boat thereon and with means for carrying oars beneath the boat, together with other small accessories for the boat.

Another object is to provide a device as in the foregoing which is light in weight, yet strong and durable, will not mar the automobile top nor vibrate thereon and is comparatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation partly in broken lines illustrating my improved device attached to an automobile top and the manner in which a boat is loaded thereon;

Figure 2 is an enlarged perspective view of the device detached;

Figure 3 is an enlarged view in cross section taken on the line 3—3 of Figure 2;

Figure 4 is an enlarged view in longitudinal section taken on the line 4—4 of Figure 2;

Figure 5 is an enlarged view in longitudinal section taken on the line 5—5 of Figure 2; and Figure 6 is a view in vertical section illustrating a dolly for use in loading a boat onto the carrier.

Referring to the drawings by numerals, the device of my invention comprises an elongated skeleton frame designated generally by the numeral 1 and which is designed for attachment in longitudinal extending position on the top 3 of an automobile 5.

The frame 1 comprises a pair of longitudinal, parallel side rails 7 of square tubing longer than the automobile top 3 to extend rearwardly of said top when the device is attached and also including front, rear and an intermediate cross rails 9, 11, 13 welded as at 15, 17, 19 to said side rails 7 and extending equidistantly outwardly beyond said side rails. The front and intermediate cross rails 9, 13 are welded on top of the side rails 7, whereas the rear cross rail 11 is welded to the undersides of the side rails 7 for a purpose presently seen. The side rails 7 are spaced closer together than the width of the top 3 and the cross rails 9, 11, 13 extend outwardly slightly beyond opposite sides of said top 3. All of the rails 7, 9, 11, 13 are formed of thin gage light strong metal.

An open top rectangular box 21 having an angle bar frame 23 and side and front and rear end panels 25, 27, 29 also of light strong metal is suitably secured on the cross rails 9, 13 in longitudinally extending position and forwardly offset position on the frame 1 relative to the rear cross rail 11, and said box 21 is of substantially the same width as the distance between the side rails 7 for a purpose presently apparent.

The front and intermediate cross rails 9, 13 are spaced apart to overlie the top 3 and are provided adjacent their outer ends with means for attaching the frame 1 on the top 3 and to the top side gutters comprising the following.

Front and rear pairs of flat, metal, V-shaped angle brackets 31, 33 depend from the front and intermediate cross rails 9, 13 outwardly of the top 3 in each pair and are welded as at 35, 37 to said rails 9, 13.

Front and rear pairs of arcuate pads 39, 41 curved to fit opposite sides of the top 3 are fixed to corresponding inner sides 43, 45 of the brackets 31, 33 by central posts 47, 49 on said pads 39, 41 and screws 51, 53. The pads 39, 41, as will be seen, support the frame 1 on the top 3 slightly elevated above said top. Front and rear pairs of terminally hooked rods 55, 57 are suitably hinged as at 59, 61 to the other sides 63, 65 of the brackets 31, 33 with turnbuckles 67, 69 therein for hooking under the side gutters 71 of the top 3 and tightening to hold the frame 1 on said top.

A pair of horizontal, elongated rollers 75 adapted to extend above the rear rail 11 and parallel therewith are detachably mounted on said rear rail 11 outwardly of the side rails 7 to facilitate loading a boat on the frame 1 from the rear of the automobile 5. The rollers 75 are journaled between pairs of upstanding ears 77 on inverted channel bars 79 fitted over the rear rail 11. Upstanding keeper arms 81 are welded as at 82 on the ends of the rear rail 11 and cylindrical rubber keeper members 83 are provided on the ends of the front and intermediate rails 9, 13 and which may be secured in place in any suitable manner. The purpose of the keeper arms 81 and the keeper members 83 will presently be explained.

The front and rear panels 27, 29 of the box 21 are provided with a pair of elongated slots 85 and a pair of holes 87, respectively for the insertion of a pair of oars, not shown, therein in a manner presently explained.

A dolly 89 is provided to use in loading and unloading a boat onto and off the frame 1 and comprises a pair of rubber tired wheels 91 on an axle bar 93 welded as at 95 to a conventional inverted U clamp 96 attachable to the transom 97 of a rowboat 99.

In loading a boat 99 onto the described carrying device the dolly 89 is attached by the clamp 96 to the transom 97 and the boat is wheeled up to the rear of the automobile 5 in inverted position tilted from a horizonal position into an upwardly and forwardly inclined position onto the rollers 75 as shown in full and dot and dash lines in Figure 1 and shoved upwardly and forwardly on said rollers and lowered until its gunwales rest on the front and intermediate cross rails 9, 13 as shown in dotted lines in Figure 1 at opposite sides of the box 21, with the boat straddling said box. When thus loaded, the keeper members 83 prevent sliding of the boat sidewise, and the dolly 89 may be detached together with the rollers 75 and stored in the automobile 5. Before loading the boat, a pair of oars, not shown, may be loaded in the box 21 by inserting the oar blades through the slots 85 and then retracting the oars to insert them through the holes 87. The loaded boat may be tied down by any suitable means to the carrying device. The manner in which the boat 99 may be unloaded will be understood without explanation. When unloading the boat 99 the dolly 89 may be attached for convenient wheeling of the boat to water. As will also be understood the side rails 7 extend rearwardly of the top 3 and the box 21 to space the rear rail 11 in the rear of said top so that when the boat 99 is loaded it will be clear of the rollers 75 to permit removal of the latter. The arms 81 prevent the channel bars 79 from sliding off the rear rail 11.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A car top accessories and boat carrier comprising an elongated box for accessories having front and rear ends and sides respectively, a boat and box supporting frame comprising a pair of boat and box supporting rails extending transversely beneath said box adjacent said front and rear ends and projecting laterally outward beyond the sides of a car and having boat rest end portions extending outwardly from the sides of the box and forming seats for the gunwales of an inverted boat loaded onto said end portions and straddling and covering the box, a pair of side rails connecting said pair of cross rails and extending from the front of said box and inward of the front of the car top to a position rearwardly of said box and of said car top for supporting a transom of a boat loaded onto said end portions and disposed inwardly of the boat rest end portions out of interfering relation to the gunwales of a boat being loaded onto said end portions, a rear cross rail secured to and underlying and disposed at the rear end of said pair of side rails in the rear of said box and extending outwardly of said side rails and car top for supporting the gunwales of a boat shoved upwardly over said rear rail in loading the boat onto said end portions, rollers on said rear cross rail disposed outwardly of said side rails for facilitating shoving of a boat upwardly over said rear cross rail, and depending brackets on the boat rest end portions for supporting the frame in elevated position on a car top, said brackets including arcuate pads resting upon and conforming to the curvature of a car top, fasteners secured to said brackets and engageable with the gutters of a car top for fastening said supporting frame thereto, said side rails and cross rails being all supported above said car top and in spaced relation thereto.

References Cited in the file of this patent
UNITED STATES PATENTS

| | | |
|---|---|---|
| 2,684,796 | Swenson | July 27, 1954 |
| 2,812,087 | Zoller | Nov. 5, 1957 |
| 2,816,672 | Facchini | Dec. 17, 1957 |